(12) United States Patent
Nogami et al.

(10) Patent No.: US 7,254,097 B2
(45) Date of Patent: Aug. 7, 2007

(54) OPTICAL DISC APPARATUS

(75) Inventors: Toyoshi Nogami, Daito (JP); Ryotaro Nakagawa, Daito (JP); Yasunori Kuwayama, Daito (JP); Yoshiaki Ukawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 550 days.

(21) Appl. No.: 10/892,143

(22) Filed: Jul. 16, 2004

(65) Prior Publication Data

US 2005/0013214 A1    Jan. 20, 2005

(30) Foreign Application Priority Data

Jul. 17, 2003    (JP)    ............................. 2003-198514

(51) Int. Cl.
    *G11B 7/00*    (2006.01)
(52) U.S. Cl. ................................. 369/44.11; 369/44.14
(58) Field of Classification Search ............ 369/44.11, 369/44.12, 44.14, 44.17, 44.21, 44.23, 44.15, 369/44.2, 44.25
    See application file for complete search history.

(56) References Cited

U.S. PATENT DOCUMENTS 4,958,336 A * 9/1990 Suzuki et al. ............ 369/44.21

FOREIGN PATENT DOCUMENTS

| JP | 61-287039 | 12/1986 |
|---|---|---|
| JP | 06-295448 | 10/1994 |
| JP | 07-169070 | 7/1995 |
| JP | 08-287488 | 11/1996 |

* cited by examiner

*Primary Examiner*—Nabil Hindi
(74) *Attorney, Agent, or Firm*—Crowell & Moring LLP

(57) ABSTRACT

An optical pickup of an optical disc apparatus has a lens holder for holding an objective lens is pivoted with a guide shaft slidably in a direction in parallel with an optical axis of the objective lens and rotatably around the guide shaft in a direction perpendicular to the optical axis. For focusing a laser beam on a data recording face of an optical disc in a focusing on operation, a wobble signal of rectangular waveform having a predetermined voltage and a predetermined frequency is applied to a tracking coil for reciprocally displacing the lens holder in the direction perpendicular to the optical axis, while a focusing coil is driven for moving the lens holder in the direction in parallel with the optical axis. Thus, the lens holder can be moved smoothly along the guide shaft, so that the possibility of failure of the focusing the laser beam on the optical disc can be reduced drastically.

2 Claims, 9 Drawing Sheets

OPTICAL DISC APPARATUS

BACKGROUND OF THE INVENTION

1. Field of the Invention

The present invention relates to an optical disc apparatus, and especially relates to stabilizing focusing on of a laser beam.

2. Description of the Related Art

Recently, an optical pickup for optical disc apparatus is proposed, in which a lens holder for holding an objective lens is slidably engaged with a guide shaft in parallel with an optical axis of the objective lens for stabilizing a posture of the objective lens of the optical pickup. In such an axial sliding type optical pickup, the lens holder is moved up and down along the guide shaft in parallel with an optical axis of the objective lens for executing the focusing servo control. The lens holder is reciprocally swung around the guide shaft for executing the tracking servo control.

For executing a focusing on operation in the optical disc apparatus having the axial sliding type optical pickup, a focusing servo mechanism is driven while the lens holder is swung out to an end in a predetermined direction around the guide shaft and the tracking servo mechanism is out of driving. There, however, is a problem that the motion of the lens holder is not smooth, since a bearing of the lens holder is forcibly slid along the guide shaft while the bearing is constantly pressed to the guide shaft in a predetermined direction. Specifically, the lens holder is hooked with the guide shaft due to adhesion of foreign substance such as dust between the bearing and the guide shaft or due to friction between surfaces of the bearing and the guide shaft, even when the focusing mechanism is driven so as to move the lens holder. Consequently, the lens holder cannot move immediately. When a driving force of the focusing mechanism is gradually increased and overcomes a load due to hooking of the lens holder with the guide shaft, the lens holder suddenly moves. Microscopically, the lens holder is moved up and down along the guide shaft with repeating the stop and the sudden movement due to the hooking and the release of the hooking.

For focusing the laser beam on a data recording face of the optical disc in the focusing on operation, it is necessary that the motion of the lens holder is smooth and the moving velocity of the lens holder is stable. On the contrary, since the lens holder repeats the sudden movement and the stop, the variation of the moving velocity of the lens holder becomes much larger. Consequently, it is highly possible that the laser beam is out of focus on the data recording face of the optical disc.

SUMMARY OF THE INVENTION

A purpose of the present invention is to provide an optical disc apparatus in which a lens holder of an optical pickup can smoothly move along a guide shaft in parallel with an optical axis of an objective lens.

An optical disc apparatus in accordance with an aspect of the present invention comprises an optical pickup in which a lens holder for holding an objective lens is slidably pivoted along a guide shaft in parallel with an optical axis of the objective lens and reciprocally swung in a direction perpendicular to the optical axis around the guide shaft. The lens holder is repeatedly displaced in the direction perpendicular to the optical axis around the guide shaft while the lens holder is moved up and down for focusing a laser beam on a data recording face of an optical disc in focusing on operation.

By such a configuration, the lens holder holding the objective lens repeats the minute displacement with respect to the guide shaft, a state instantaneously occurs that a bearing of the lens holder is detached from the guide shaft. By executing the focusing on operation under such the condition, an interval of the microscopic movement and stop of the lens holder becomes shorter and the displacement of the lens holder becomes smaller. Consequently, the macroscopic movement of the lens holder becomes smooth and the variation of the moving velocity of the lens holder becomes smaller. The possibility of failure of the focusing the laser beam on the optical disc can be reduced drastically.

For displacing the lens holder repeatedly in the direction perpendicular to the optical axis of the objective lens around the guide shaft, it is preferable that a wobble signal of triangular waveform having a predetermined voltage and a predetermined frequency is applied to tracking coils.

Since the voltage and the frequency of the wobble signal is the factors which can be varied due to the weights of the objective lens and the lens holder, the surface roughness and the materials of the bearing of the lens holder and the guide shaft 58, and so on, the most suitable values of the voltage and the frequency of the wobble signal should be experimentally selected as inherent values of each optical pickup.

DETAILED DESCRIPTION OF THE EMBODIMENT

An optical disc apparatus in accordance with an embodiment of the present invention is described with reference to figures.

Figure 1:
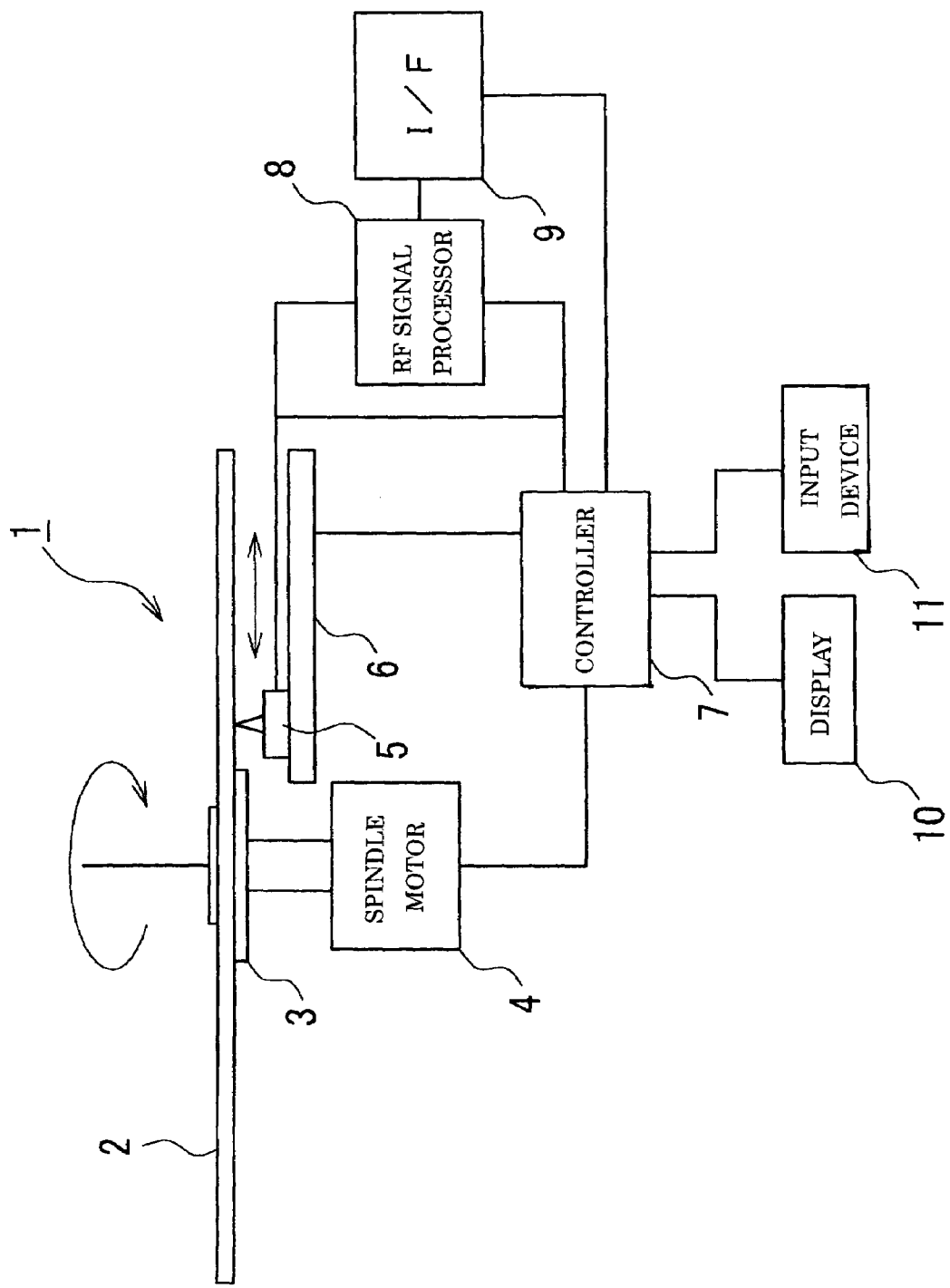
FIG. 1 is a block diagram showing a configuration of an optical disc apparatus in accordance with an embodiment of the present invention.

A configuration of the optical disc apparatus 1 in accordance with the embodiment is shown in FIG. 1. The optical disc apparatus 1 not only irradiates a laser beam having a predetermined wavelength to an optical disc 2 for reading data recorded on the optical disc 2, but also irradiates another laser beam having a higher power than that in the reading the data for recording data on a recordable optical disc 2 such as a DVD-R, a DVD-RW, a DVD-RAM, or the like.

The optical disc apparatus 1 comprises a table 3 for holding the optical disc 2, a spindle motor 4 for rotating the table 3 with the optical disc 2 held thereon, an optical pickup 5 for irradiating a laser beam to the optical disc 2, an optical pickup driving mechanism 6 for moving the optical pickup 5 in a radial direction of the optical disc 2 and a controller 7 for controlling spindle motor 4, the optical pickup 5, the optical pickup driving mechanism 6, and so on. The optical pickup 5 irradiates the laser beam for recording data on the optical disc 2 and/or for reading data from the optical disc 2. The optical pickup 5 outputs an RF signal. The optical disc apparatus 1 further comprises an RF signal processor 8 processes the RF signal outputted from the optical pickup 5, an interface (I/F) 9 for outputting the processed RF signal to a personal computer, a monitor display apparatus, and so on, a display device 10 such as an LCD (liquid crystal display) for displaying an operative condition of the optical disc apparatus 1 or a message to a user, and an input device 11 such as push button switches or a remote control device operated by the user for selecting a motion of the optical disc apparatus 1.

Figure 2:
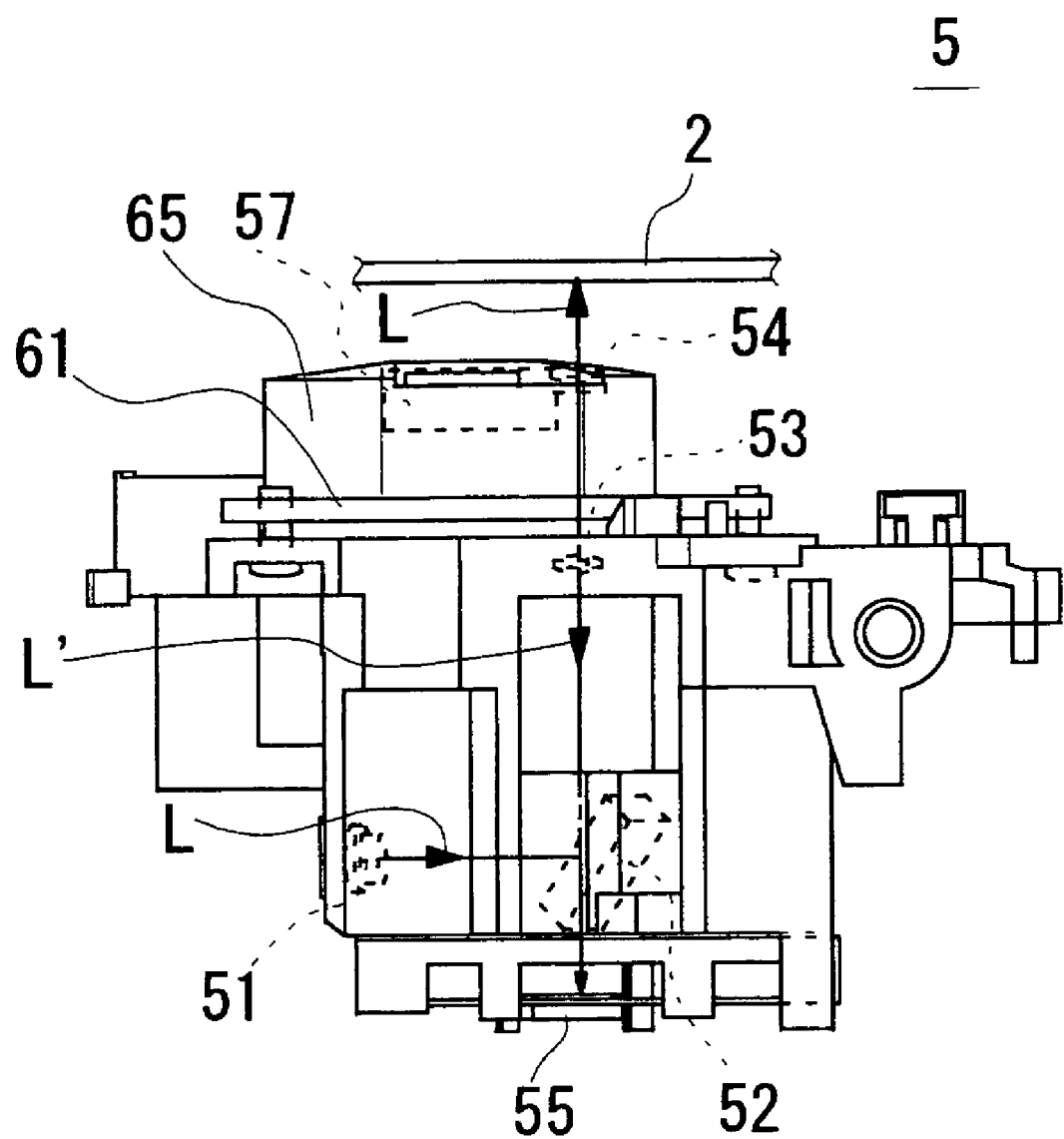
FIG. 2 is a front view showing a configuration of an optical pickup of the optical disc apparatus in accordance with the embodiment.
Figure 3:
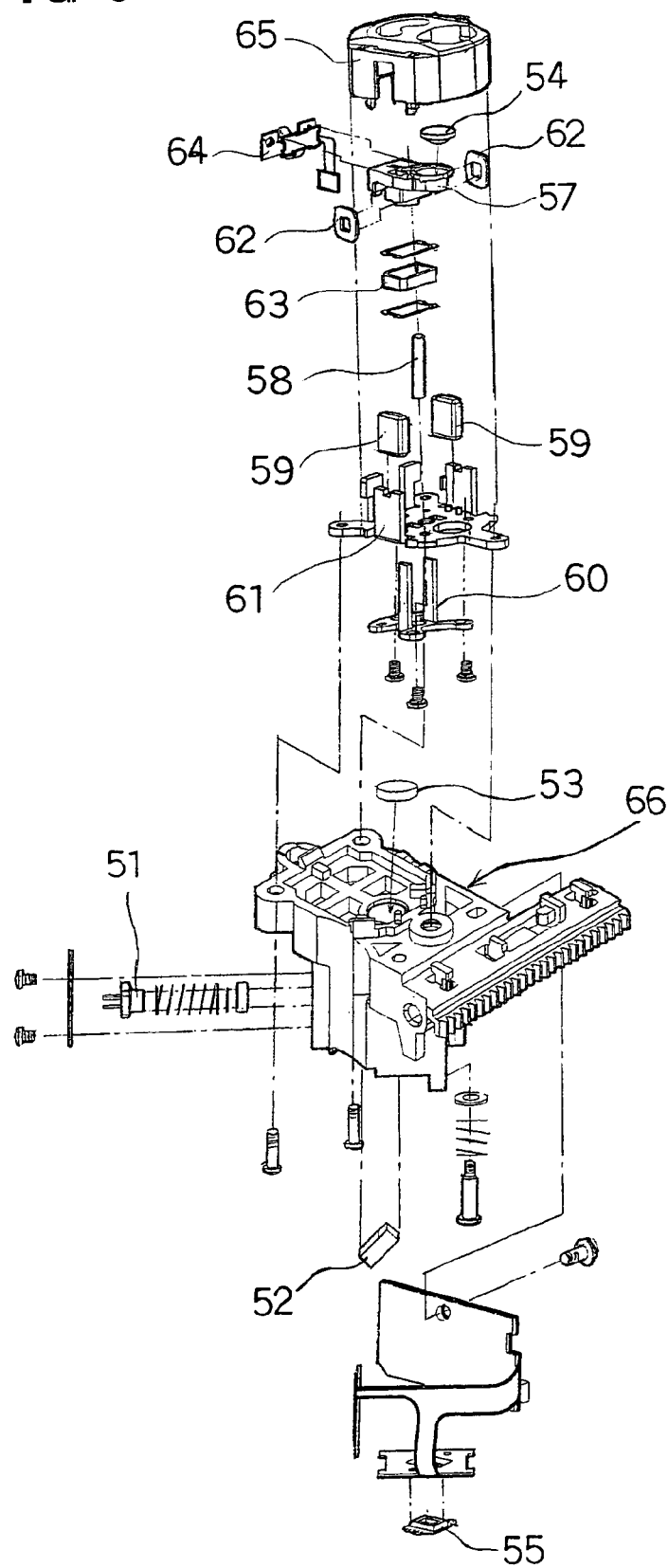
FIG. 3 is an exploded perspective view showing a configuration of the optical pickup in the embodiment.

A front view of the optical pickup 5 is shown in FIG. 2. An exploded perspective view of the optical pickup 5 is shown in FIG. 3. The optical pickup 5 comprises a laser diode 51 for outputting the laser beam L having a predetermined wavelength, a half mirror 52 for reflecting the laser beam L toward the optical disc 2, a collimator lens 53 for expanding the laser beam L reflected by the half mirror 52 as a parallel beam, an objective lens 54 for focusing the parallelized laser beam L on a data recording face of the optical disc 2, and a photo-detector 55 for receiving reflected beam L' from the optical disc 2 and for converting the light energy to electric signal.

As shown in FIG. 3, the objective lens 54 is held on a lens holder 57. A bearing of the lens holder 57 is engaged with a guide shaft 58 in a manner so that the lens holder 57 can be slid in a direction parallel to an optical axis of the objective lens 54 and can be swung in a direction perpendicular to the optical axis. A pair of tracking coils 62 for generating a driving force of tracking servo control, a focusing coil 63 for generating a driving force of focusing servo control and a circuit board 64 are provided on the lens holder 57.

Figure 4:
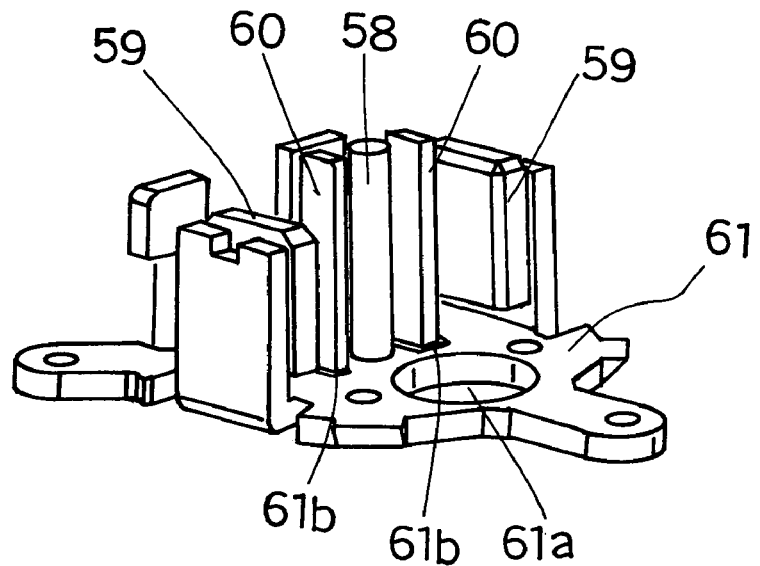
FIG. 4 is a perspective view showing a detailed structure of a base member of the optical pickup in the embodiment.

The guide shaft 58 is implanted on a base member 61. A pair of permanent magnets 59 and a yoke 60 are further fixed on the base member 61 in a manner so that they form a magnetic path when magnetic fluxes owing to the permanent magnets 59 pass through the yoke 60. Each permanent magnet 59 is fixed in a manner so that an N pole thereof faces the guide shaft 58. Detailed structure of the base member 61 is shown in FIG. 4. Two arms of the yoke 60 penetrate a pair of rectangular openings 61b of the base member 61 upwardly from a lower face and respectively face the permanent magnets 59. A larger and circular opening 61a is further formed on the base member 61, through which the laser beam L and the reflected beam L' can pass.

Figure 5:
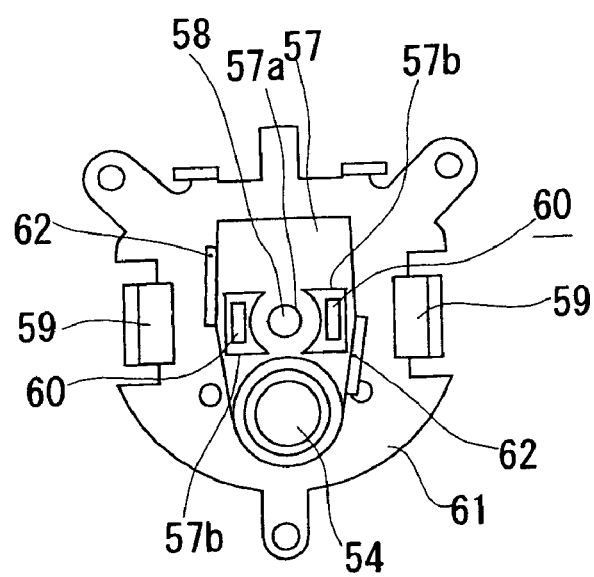
FIG. 5 is a plan view showing a structure of the base member on which a lens holder is mounted in the embodiment.

FIG. 5 shows a state that the lens holder 57 is engaged with the guide shaft 58 implanted on the base member 61. The lens holder 71 has a bearing 57a formed substantially at the center thereof, and a pair of openings 57b provided at both side of the bearing 57a through which the arms of the yoke 60 penetrates. The tracking coils 62 are provided symmetrically with respect to the bearing 57a. The lens holder 57 is floated from the base member 61 owing to magnetic reaction of two permanent magnets 59.

When electric power is supplied to the focusing coil 63, the lens holder 57 is moved up or down along the guide shaft 58 owing to magnetic reaction of the permanent magnets 59 and the focusing coil 63. Thus, a focused point of the laser beam L in a direction of the optical axis of the objective lens 54 can be adjusted by moving the lens holder 57 up and down. Such the operation for adjusting the focused point of the laser beam L in the direction of the optical axis of the objective lens 54 is called "focusing servo control".

When electric power is supplied to the tracking coils 62, the lens holder 57 can be swung around the guide shaft 58 insofar as the arms of the yoke 60 are not contacted with the edges of the openings 57b. Thus, a focused point of the laser beam L in a direction perpendicular to the optical axis of the objective lens 54 can be adjusted by swinging the lens holder 57 around the guide shaft 58. Such the operation for adjusting the focused point of the laser beam L in the direction perpendicular to the optical axis of the objective lens 54 is called "tracking servo control".

As illustrated in FIG. 3, after fixing the objective lens 54, the tracking coils 62, the focusing coil 63 and the circuit board 64 on the lens holder 57, and fixing the guide shaft 58, the permanent magnets 59, the yoke 60 and so on, on the base member 61, a moving portion of the optical pickup 5 can be modularized by mounting the lens holder 57 on the base member 61 and fitting a cover member 65 thereon. The optical pickup 5 is assembled by fixing the modularized moving portion on a main body 66 of the optical pickup 5 with using a screw, or the like.

Subsequently, a focusing on operation of the optical disc apparatus 1 is described. When a user input an instruction for reading data recorded on a specific track on the optical disc 2 by operating the input device 11, the controller 7 drives the optical pickup driving mechanism 6 so as to move the optical pickup 5 in the radial direction of the optical pickup 2. Simultaneously, the controller drives the optical pickup 5 so that the data can be read out from the optical disc 2. The controller 7 applies a wobble signal of triangular waveform having a predetermined voltage and a predetermined frequency to the tracking coil 62 repeatedly for displacing or vibrating the lens holder 57 by a minute distance in the direction perpendicular to the optical axis of the objective lens 54. On the other hand, the controller 7 applies a focusing drive signal corresponding to focusing error signal to the focusing coil 63 similar to the conventional focusing on operation.

In the conventional optical disc apparatus, only the focusing servo mechanism is driven with stopping the tracking servo mechanism by applying no tracking drive signal is applied to the tracking coil in the focusing on operation. Therefore, there is a problem that the motion of the lens holder is not smooth due to the friction between the bearing of the lens holder and the guide shaft, as mentioned above.

On the contrary, in the optical disc apparatus 1 in accordance with the embodiment, the wobble signal is further applied to the tracking coils 62 in the focusing on operation. Since the lens holder 57 holding the objective lens 54 repeats the minute displacement with respect to the guide shaft 58, a state instantaneously occurs that the bearing 57a of the lens holder 57 is detached from the guide shaft 58. By executing the focusing on operation under such the condition, an interval of the microscopic movement and stop of the lens holder 57 becomes shorter and the displacement of the lens holder 57 becomes smaller. Consequently, the macroscopic movement of the lens holder 57 becomes smooth and the variation of the moving velocity of the lens holder 57 becomes smaller.

Figure 6A:
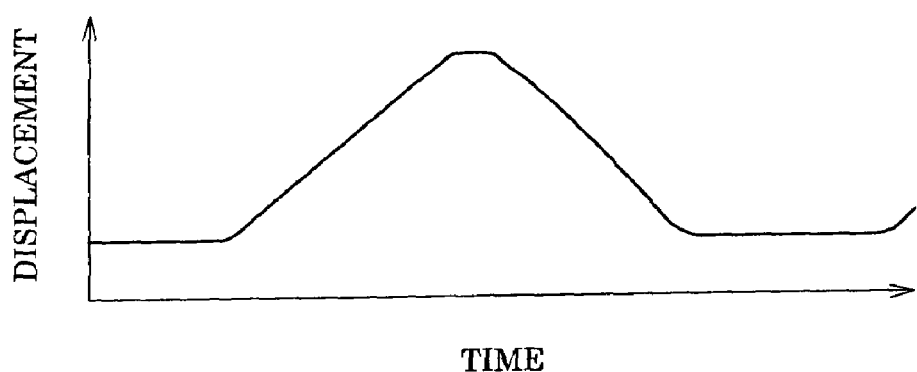
FIG. 6A is a graph showing a variation of position of the lens holder while the optical disc apparatus in accordance with the embodiment is in focusing on operation.
Figure 6B:
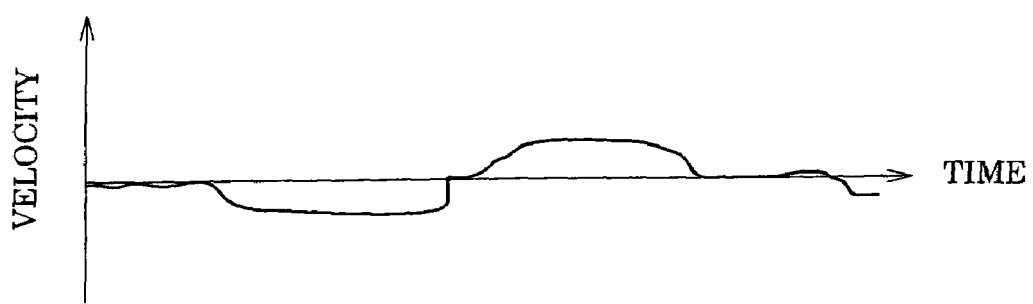
FIG. 6B is a graph showing a variation of moving velocity of the lens holder in the focusing on operation.
Figure 7A:
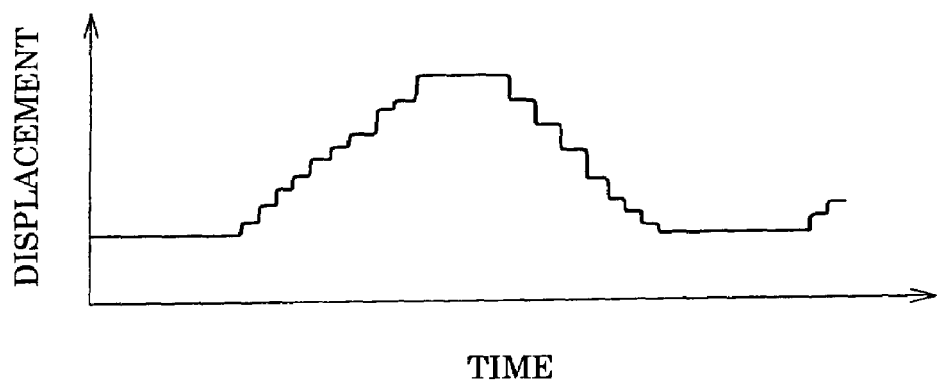
FIG. 7A is a graph showing a variation of position of a lens holder of a conventional optical disc apparatus while the conventional optical disc apparatus is in focusing on operation.
Figure 7B:
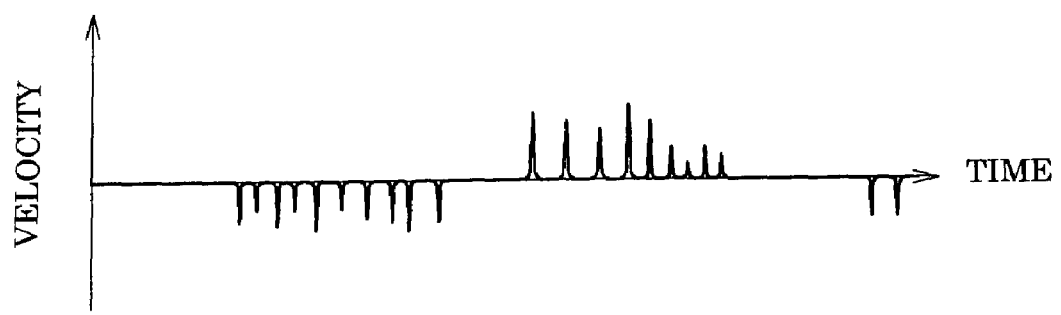
FIG. 7B is a graph showing a variation of moving velocity of the lens holder of the conventional optical disc apparatus in the focusing on operation.

A variation of the position and a variation of the moving velocity of the lens holder 57 in the focusing on operation of the optical disc apparatus 1 in accordance with the embodiment are respectively shown in FIGS. 6A and 6B. A variation of the position and a variation of the moving velocity of the lens holder in the focusing on operation of the conventional optical disc apparatus (specifically, the optical disc apparatus 1 is driven by the conventional manner) are respectively shown in FIGS. 7A and 7B. In FIGS. 6A and 7A, the position of the lens holder is measured as a displacement of the lens holder using the passage of time. In FIGS. 6B and 7B, the moving velocity of the lens holder is calculated as differential of the displacement of the lens holder.

In comparison with FIGS. 6A and 6B and FIGS. 7A and 7B, it is found that the macroscopic movement of the lens holder 57 becomes much smoother and the variation of the moving velocity of the lens holder 57 becomes much smaller, when the lens holder 57 is vibrated in the direction perpendicular to the optical axis of the objective lens 54 by applying the wobble signal to the tracking coils 62. Consequently, the possibility of failure of the focusing the laser beam L on the optical disc 2 can be reduced drastically.

Figure 8A:
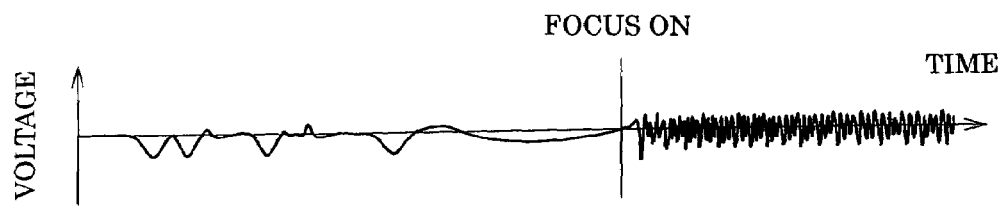
FIG. 8A is a graph showing a variation of waveform of a focusing driving signal in the optical disc apparatus in accordance with the embodiment.
Figure 8B:
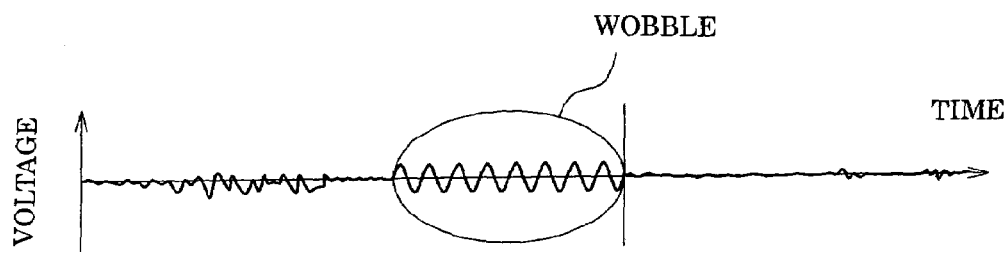
FIG. 8B is a graph showing a variation of waveform of a tracking driving signal in the optical disc apparatus in accordance with the embodiment.
Figure 8C:
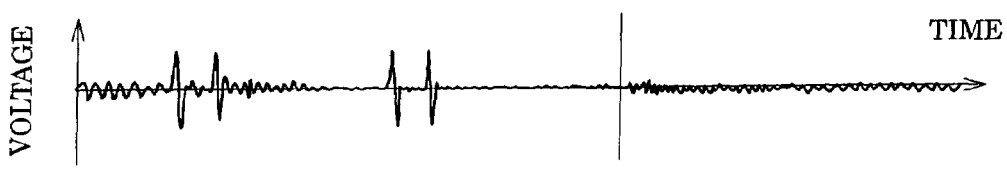
FIG. 8C is a graph showing a variation of waveform of a focusing error signal in the optical disc apparatus in accordance with the embodiment.
Figure 9A:
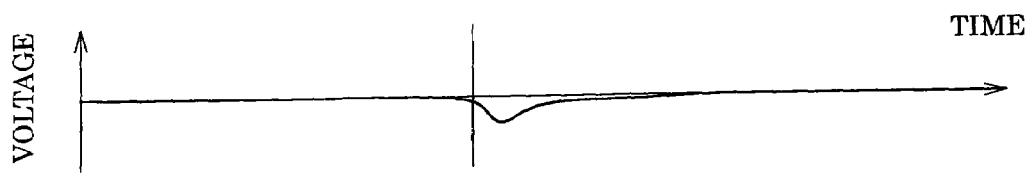
FIG. 9A is a graph showing a waveform of the focusing driving signal in the optical disc apparatus in accordance with the embodiment in which the abscissa showing time axis is expanded a thousand times.
Figure 9B:
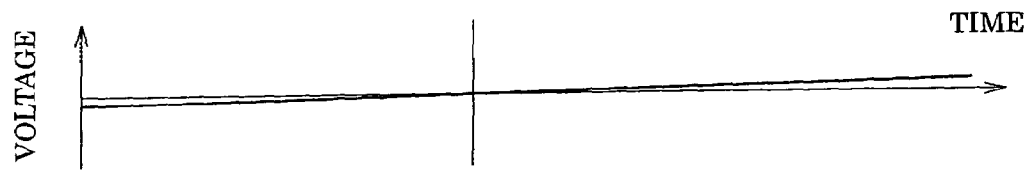
FIG. 9B is a graph showing a waveform of the tracking driving signal in the optical disc apparatus in accordance with the embodiment in which the abscissa showing time axis is expanded a thousand times.
Figure 9C:
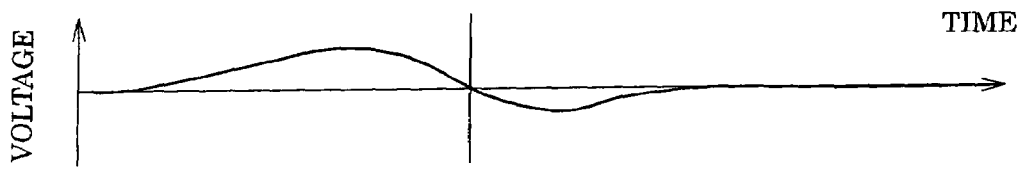
FIG. 9C is a graph showing a waveform of the focusing error signal in the optical disc apparatus in accordance with the embodiment in which the abscissa showing time axis is expanded a thousand times.

Subsequently, examples of waveforms of the focusing drive signal, the tracking drive signal and the focusing error signal, which are displayed on a screen of an oscilloscope while the focusing on operation of the optical disc apparatus 1 in accordance with the embodiment, are shown in FIGS. 8A to 8C. FIG. 8A shows the waveform of the focusing drive signal. FIG. 8B shows the waveform of the tracking drive signal. FIG. 8C shows the waveform of the focusing error signal. In FIG. 8B, the triangular waveform portion at the center corresponds the wobble signal. In these examples, when the laser beam L is focused on the optical disc 2, the controller 7 stops the application of the wobble signal to the tracking coils 62 and makes the transition to the application of the tracking drive signal corresponding to the tracking error signal. FIGS. 9A to 9C respectively show the waveforms of the focusing drive signal, the tracking drive signal and the focusing error signal in the vicinity of the time of the focusing on, in which the abscissa showing time axis is expanded a thousand times. As can be seen from FIGS. 9A to 9C, it is found that the laser beam L is smoothly focused on the optical disc 2.

Subsequently, a method for obtaining the most suitable wobble signal is described. The voltage and the frequency of the wobble signal is the factors which can be varied due to the weights of the objective lens 54 and the lens holder 57, the surface roughness and the materials of the bearing 57a of the lens holder 57 and the guide shaft 58, and so on. Thus, the most suitable values of the voltage and the frequency of the wobble signal are experimentally selected as inherent values of each optical pickup 5.

Figure 10:
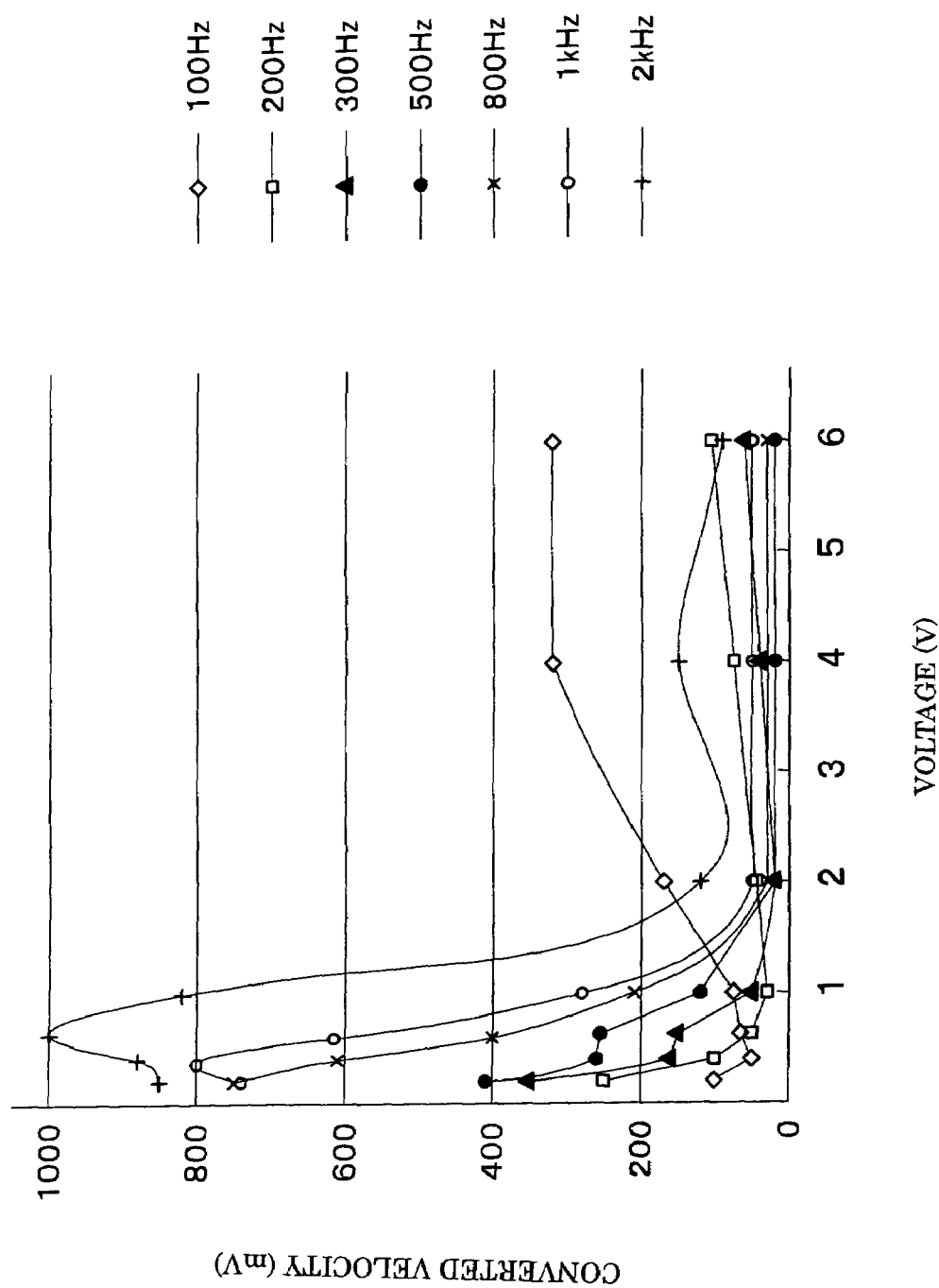
FIG. 10 is a graph showing relations between the moving velocity of the lens holder and variation of a voltage and a frequency of a wobble signal in the optical disc apparatus in accordance with the embodiment.

For example, the frequency of the wobble signal is fixed, and the peak-to-peak voltage of the triangular waveform of the wobble signal is gradually increased from 0 V to 6 V. The largest absolute value of the moving velocity of the lens holder 57, for example, shown in FIG. 6B is measured and the measured values are plotted on a graph. The same measurements are repeated while the frequency of the wobble signal is gradually varied from 100 Hz to 2 kHz. An example of the result of measurements is shown in FIG. 10. In FIG. 10, the moving velocity of the lens holder 57 is converted to voltages.

In a region that the voltage of the wobble signal is equal to or smaller than 2 V, it is found that the higher the frequency becomes, the faster the moving velocity of the lens holder becomes, except the case that the frequency of the wobble signal is 100 Hz. In a region that the voltage of the wobble signal is larger than 2V, it is found that the moving velocity of the lens holder becomes substantially equal but relatively slow except the cases that the frequencies of the wobble signals are 100 Hz and 2 kHz. It is believed that the time for displacing the lens holder becomes shorter corresponding to the increase of the frequency of the wobble signal, so that the displacement of the lens holder becomes smaller. Thus, it is necessary for setting the voltage of the wobble signal higher for enlarging the displacement of the lens holder. On the contrary, when the frequency of the wobble signal is selected to be lower, the displacement of the lens holder becomes larger, but the moving velocity of the lens holder becomes too slow. Thus, it adversely affects the motion of the lens holder.

In this example, it is preferable that the frequency of the wobble signal is equal to or larger than 200 Hz but smaller than 1 kHz, and the voltage of the wobble signal is equal to or larger than 2 V but smaller than 4 V. More specifically, the frequency and the voltage of the wobble signal are respectively selected to be 500 Hz and 3.5 V. For confirmation, theses values of the frequency and the voltage of the wobble signal are applicable to a sample used for the experience by the inventors, so that the frequency and the voltage of the wobble signal used in the optical disc apparatus 1 in accordance with the present invention is not limited by the numerical examples described in the embodiment.

By applying various wobble signals in which the voltage and the frequency are varied are serially applied to the actual optical pickup 5, it is possible to find the most suitable condition for executing the focusing on operation smoothly. Since the hardware configuration of the optical pickup 5 of the optical disc apparatus 1 in accordance with the embodiment is substantially the same as that of the conventional optical disc apparatus, it is easy to realize the optical disc apparatus in accordance with the present invention by changing the software configuration of the conventional optical disc apparatus in a manner so that the wobble signal having a predetermined voltage and a predetermined frequency is applied to the tracking coils while the focusing on operation is executed.

As mentioned above, the optical disc apparatus in accordance with the present invention applies the wobble signal of triangular waveform having the predetermined voltage and the predetermined frequency is applied to the tracking coils while the focusing on operation. Thus, the focusing on operation can be executed by driving the focusing coil of the optical head, while the bearing of the lens holder has been minutely vibrated in the direction perpendicular to the optical axis of the objective lens with respect to the guide shaft. Consequently, the macroscopic movement of the lens holder becomes much smoother and the variation of the moving velocity of the lens holder becomes much smaller than those in the conventional optical disc apparatus, so that the possibility of failure of the focusing the laser beam on the optical disc can be reduced drastically.

This application is based on Japanese patent applications 2003-177576 filed Jun. 23, 2003 and 2003-198514 filed Jul. 17, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus comprising:
   an optical pickup in which a lens holder for holding an objective lens is slidably pivoted alone a guide shaft in parallel with an optical axis of the objective lens and reciprocally swung in a direction perpendicular to the optical axis around the guide shaft; wherein
   the lens holder is repeatedly displaced in the direction perpendicular to the optical axis around the guide shaft while the lens holder is moved up and down for focusing a laser beam on a data recording face of an optical disc in focusing on operation, and
   a wobble signal of triangular waveform having a predetermined voltage and a predetermined frequency is applied to a tracking coil for displacing the lens holder repeatedly in the direction perpendicular to the optical axis of the objective lens around the guide shaft.

2. An optical disc apparatus comprising an optical pickup, wherein
   the optical pickup further comprises:
   a laser diode for emitting a laser beam to an optical disc;
   an objective lens for focusing the laser beam emitted from the laser diode on a data recording face of an optical disc;
   a photo-detector for receiving reflected beam reflected from the optical disc and for converting light signals of the reflected beam to electric signals;
   a lens holder for holding the objective lens;
   a guide shaft engaged with a bearing of the lens holder for pivoting the lens holder in a manner so that the lens holder can be slid in a direction in parallel with an optical axis of the objective lens and reciprocally swung in a direction perpendicular to the optical axis;
   a focusing servo mechanism for moving the lens holder in the direction in parallel with the optical axis including at least a focusing coil, a yoke and a permanent magnets;
   a tracking servo mechanism for moving the lens holder in the direction perpendicular to the optical axis including at least a tracking coil, a yoke and a permanent magnet; and
   a wobble signal of triangular waveform having a predetermined voltage and a predetermined frequency is applied to the tracking coil for displacing the lens holder repeatedly in the direction perpendicular to the optical axis of the objective lens around the guide shaft, while the lens holder is moved in the direction in parallel with the optical axis for focusing the laser beam on the data recording face on the optical disc by driving the focusing coin in a focusing on operation.

* * * * *